United States Patent [19]
Bogle et al.

[11] Patent Number: 5,597,063
[45] Date of Patent: Jan. 28, 1997

[54] REMOVAL OF GLASS ARTICLES FROM CONVEYOR BELTS

[75] Inventors: David W. Bogle, Mandeville; Timothy J. Hicks, Hammond, both of La.; Clinton T. Favre, Bel Air, Md.

[73] Assignee: The Laitram Corporation, La.

[21] Appl. No.: 553,954

[22] Filed: Nov. 6, 1995

[51] Int. Cl.[6] ............................................. B65G 47/74
[52] U.S. Cl. ........................................................ 198/635
[58] Field of Search ................................. 198/324, 325, 198/600, 635, 636

[56] References Cited

U.S. PATENT DOCUMENTS

| | | | |
|---|---|---|---|
| 3,687,257 | 8/1972 | Johnson | 198/325 |
| 4,765,454 | 8/1988 | Hodlewsky et al. | 198/635 |
| 4,821,869 | 4/1989 | Hodlewsky | 198/635 X |
| 4,832,187 | 5/1989 | Lapeyre . | |
| 4,858,751 | 8/1989 | Hodlewsky | 198/325 X |
| 5,083,659 | 1/1992 | Bode et al. . | |
| 5,215,182 | 6/1993 | Garbagnati | 198/635 |
| 5,322,158 | 6/1994 | Borsboom et al. . | |

*Primary Examiner*—D. Glenn Dayoan
*Attorney, Agent, or Firm*—Laurence R. Brown; James T. Cronvich

[57] ABSTRACT

An article removal platform assembly with laterally movable finger plate is provided particularly suitable for abutting a conveyor belt as it passes over a sprocket wheel to remove glass articles and broken glass fragments from the belt. The generally rectangular finger plates are mounted in a lateral sliding configuration to a planar platform by at least three fasteners extending through mounting apertures through the finger plates 50, spaced to prevent lateral or longitudinal tilt. The mount has elongated fastening members adjustably aligned to let fingers mate in a conveyor belt and freely slide laterally a limited amount in either direction. Thus, the finger plates can slide side-to-side to follow belt wander when the fasteners engage ridges of the apertures through the finger plates. Also provided are snap-in caps for the apertures for maintaining a planar discharge surface having a constant coefficient of sliding friction that does not accumulate residue. The conveyor belt outer surface is formed by ribs defining channels for receiving the finger plate fingers disposed adjacent to the sprocket wheel to form therewith a co-planar discharge route. The fingers are stubby plates with upwardly slanted pointed ends positioned to scoop residue including glass fragments out of the belt channels and contoured lower surfaces for mating peripherally about the path of the conveyor belt where it bends over the sprocket wheel. Brittle plastic fingers, if overloaded by glass fragments wedging under the fingers would snap off for discharge onto co-planar discharge surface.

11 Claims, 1 Drawing Sheet

REMOVAL OF GLASS ARTICLES FROM CONVEYOR BELTS

TECHNICAL FIELD

This invention relates to the transfer of articles moving off a conveyor belt onto a receptacle platform and more particularly it relates to finger plate platforms particularly adapted to receive glass articles and remove broken glass fragments from the conveyor belt.

BACKGROUND ART

Typical finger plates of the prior art have long slender flexible fingers disposed in channels between the raised ribs defining the conveying surface of a modular belt, and are positioned for continuation of the conveying surface at a position where the conveyor belt moves in a curved path about a sprocket wheel, as seen in FIG. 17 of U.S. Pat. No. 4,832,187 to James M. Lapeyre, May 23, 1989, for example. The tip ends of the fingers are inclined downwardly from the conveying surface to lie just below the conveying surface. Snap in mounts for quickly removing the finger plates when damaged are provided in U.S. Pat. No. 5,322,158 to W. A. Borsboom, et al., Jun. 21, 1994, and such finger plates are rotatably mounted for optional insertion and use in U.S. Pat. No. 5,083,659, Robert H. Bode, et al., Jan. 28, 1992.

The long slender fingers made of plastic however were subject to vibration and flexing, thus increasing the possibility of letting broken glass fragments which are carried in the conveyor belt channels to sneak under the finger tips without being deflected upwardly and out of the belt. Accordingly the fingers have been shortened heretofore to improve performance.

However, with thicker shorter and thus stronger fingers in which broken glass fragments may become wedged for example, significant pressures may be exerted against finger plates to produce tilt and wobble forces that misalign the junction of the finger plate and the conveyor belt and interrupt the discharge of articles conveyed by the belt on the finger plate platform or cause catastrophic failure of a finger plate assembly.

Accordingly an explicit object of the invention is to provide an improved finger plate mounting assembly that will produce reliable flow of articles from the belt onto a finger plate when encountering broken glass fragments and in the presence of such operating conditions as significant temperature changes and lateral wandering of the belt.

A more general object of this invention is to improve the state of the finger plate art and provide article removal platform assemblies particularly adapted to handle glass articles and to confront broken glass particles that may be found on the incoming conveyor belt without interruption in the flow of articles off the belt.

DISCLOSURE OF THE INVENTION

A molded or machined plastic finger plate for an article removal platform assembly is provided particularly suitable for abutting a conveyor belt as it passes over a sprocket wheel to remove glass articles from the belt at a discharge station and to harvest broken glass fragments from the belt out on the platform for disposal. The conveyor belt channels between the ribs, which receive and convey glass fragments, are thus scooped by specially formed plastic fingers to remove the fragments. The fingers and accompanying finger plate are particularly structured to more reliably function to remove conveyed articles from the surface of the ribs in the presence of dynamic forces which could cause finger or finger plate flutter. Thus, the plastic fingers constitute stubby wide vertically disposed plate structure with upwardly slanted pointed fingertips positioned to reach downwardly into the channels between belt ribs for scooping out residue including glass fragments. They are made of a brittle and unflexible plastic that does not tend to vibrate and which will snap off upon encountering excessive force from a glass chard that might be forced under the fingers as the conveyor belt rotates. These finger plates are thick enough to ride comfortably in the belt channels and have an accurately contoured lower surface for mating peripherally into the between-rib channels about the arcuate path of the conveyor belt passing over the sprocket wheel at the discharge station. Thus, it is unlikely that any residue, other than that deeply embedded in the belt channels, including glass fragments will escape the scooping action of the fingers for discharge upwardly onto a solid planar finger plate surface from which the fingers integrally extend.

The finger plate has novel mounting features for stably interdigitating the fingers to form a co-planar conveying surface with the ribs forming the planar belt conveying surface, and yet is attached to a fixed framework supporting member in a manner permitting a degree of free lateral movement. The mounting structure in the finger plate thus comprises three apertures lodged in a triangular configuration for holding the finger plate firmly and tiltlessly to the supporting member. Thus, the plate is not subject to vibration or tilt either side-to-side or end-to-end in a manner that would interfere with the discharge of articles from the conveyor belt. In the apertures three corresponding slides permitting the finger plate to move laterally, serve also as specially configured fasteners, thus permitting the plates to follow dynamic operating conditions including lateral belt wander and thermal dimensional changes. Internal ridges about these finger plate apertures are confronted by firmly secured fastener-slider members in a lateral sliding configuration. The finger plate apertures also serve as a receptacle mating with snap in aperture closing caps for maintaining a smooth planar discharge surface on the finger plate that does not accumulate residue or change the discharge friction of articles discharged to move across the plate.

Other objects, features and advantages of the invention will be found throughout the following description, claims and accompanying drawings.

BRIEF DESCRIPTION OF THE DRAWINGS

In the accompanying drawing wherein similar reference characters are used throughout the various views to facilitate comparison.

THE PREFERRED EMBODIMENT

Figure 1:
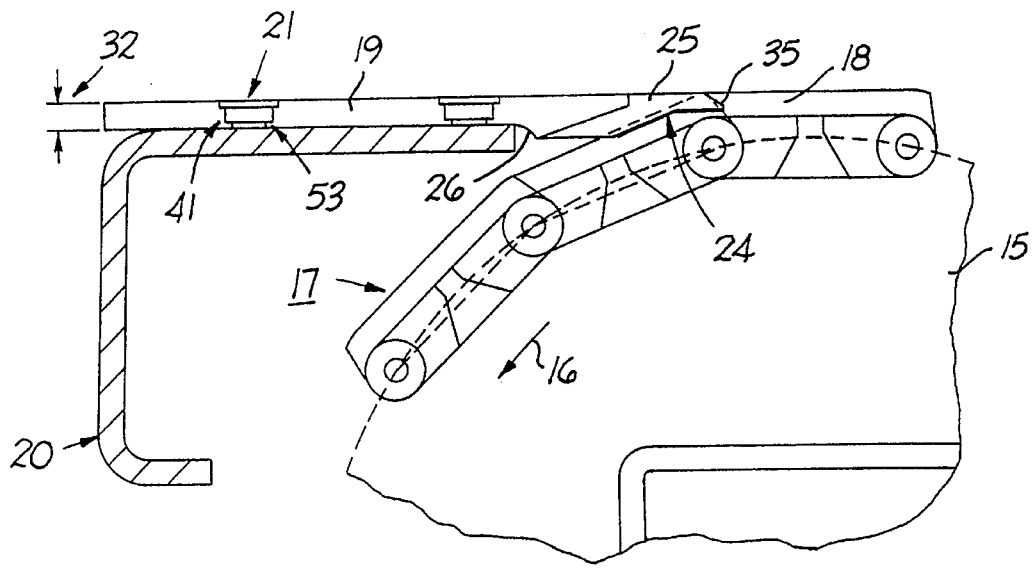
FIG. 1 is a fragmental side view, partly in section of a conveyor belt article discharge station incorporating the finger plate improvements afforded by this invention.

As seen from FIG. 1, the sprocket wheel 15 rotating in the direction 16 moves the belt to the left for discharge of conveyed articles (not shown) from the conveyor belt onto the stationary finger plate 19. The finger plate is securely fastened by at least three fastener assemblies 21, 22, etc. located in corresponding mounting apertures 29, 30, 31 (FIG. 2) extending through the planar plastic aperture plate structure of constant predetermined thickness 32 to the left of the integral fingers 25 and lower ridge 26. This assures that the finger plate will not be tiltable either side-by-side or end-to-end when encountering forces such as may be applied if a glass chard carried in the belt channel between ribs 18 defining the conveying plane of the belt 17 were to become lodged underneath one of the fingers 25.

The finger 25 structure is seen to include a fingertip 35 directed downwardly into the belt channel for scooping out debris and discharging it on the upper surface of the finger plate 19. The finger is short and stubby comprising a plate that has a bottom arcuate contour 24 positioned to mate with, but to diverge in the direction of rotation slightly from, the belt channel bottom path 27 about the sprocket wheel 15. Thus, deeply embedded residue that is not scooped out upwardly by the fingertips 35 can be unwedged from between the belt channels and move easily along the diverging bottom of the fingers 25 under the finger plate 19. The plastic construction of the finger plate from a brittle and a relatively inflexible plastic makes the fingers 25 strong enough to remove broken pieces of glass that may be wedged into the belt and carried to the discharge station. However the plastic finger plate structure is constructed with break away strength of a magnitude that the belt will not be damaged, and thus snaps off for discharge onto the platform when overstressed.

Because of the short stubby plate 40 configuration of the fingers, the article transfer and debris cleaning characteristics of the fingers is excellent. The co-planar article conveying surfaces of the finger plate and conveyor belt thus is not compromised by vibrating flexible fingers or longer fingers flexed out of place by debris such as broken glass. Nor do they tend to vibrate under variations of loading or by flopping of the belt 17.

Figure 2:
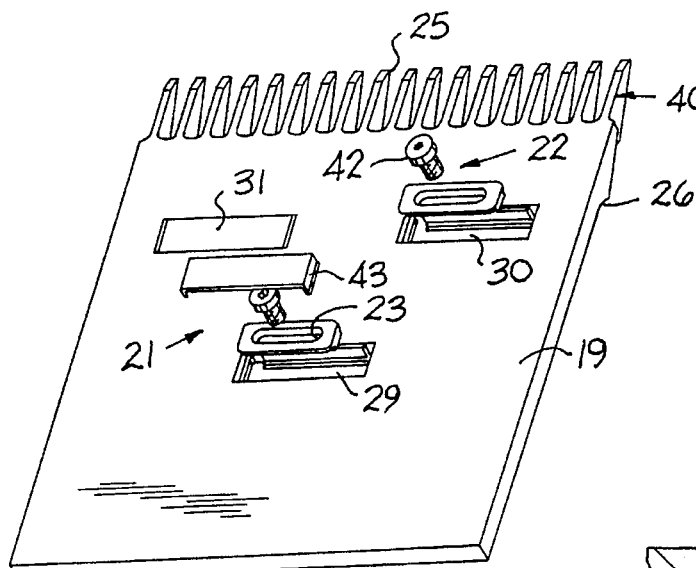
FIG. 2 is a perspective view of the novel finger plate afforded by this invention incorporating an exploded view of the mounting finger plate aperture structure and mounting attachments therefor.

The three hole triangular finger plate mount, best shown in FIG. 2, stably secures the plate so that it cannot tilt, rock or deflect either laterally in a side-to-side direction or longitudinally end-to-end but remains free to slide side-to-side when encountering either thermal expansion or belt wander. The aperture structure for achieving this is shown by the enlarged side and end section views of FIGS. 3 and 4. In general, there are three mounting accessories, an elongated shoulder washer 41 for receiving a fastener bolt or screw 42, and an aperture snap-in coverplate 43.

Figure 3:
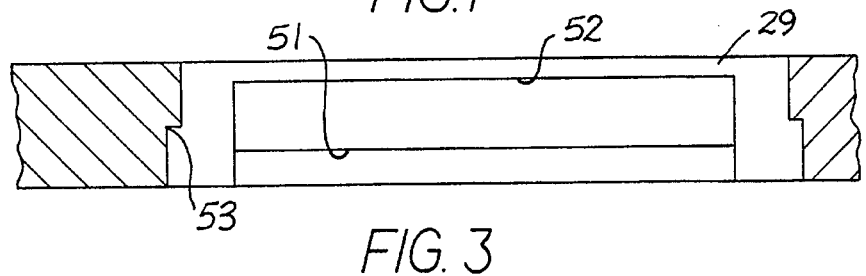
FIGS. 3 and 4 are respectively enlarged side section view and end section view embodiments of the mounting aperture structure in the finger plate.
Figure 4:
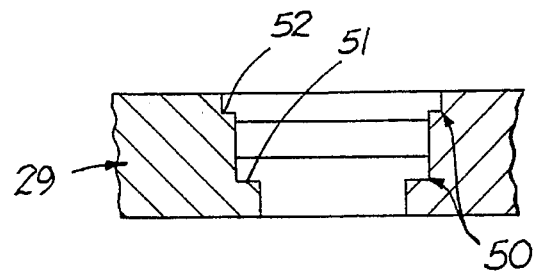

The corresponding cooperating finger plate aperture structure, as seen from FIG. 4, is the upper and lower ridges 50 formed on the sidewalls as seen from FIG. 3. Thus, the lower ridge 51 slides under the shoulders of the elongated shoulder washer 41. This shoulder washer 41 is shorter than the receiving aperture and therefore permits a degree of lateral side-to-side movement of the finger plate 19. The shoulder washer 41 abuts the mounting support member 20 (FIG. 1). The bolt 42 extends through the laterally elongated slot of the shoulder washer 41 and threadably engages a threaded mounting hole in the support member 20. The shoulder washer 41 is thus held firmly down against the support member 20. The thickness of the shoulder washer 41 is such that it slidingly engages the lower ridge 51 with little vertical play when the shoulder washer is secured in place by the bolt 42 to restrain the finger plate 19 against rising away from the support member 20. Because the shoulder washer 41 is elongated, it contacts the lower ridge 51 along a lateral surface length to distribute severe loads, which can occur in the presence of forcibly wedged debris. This reduces the possibilities of fracturing along the length of the ridge. Also note that a designated degree of lateral sliding contact can be adjustably set by movement of the oblong shoulder 23 aperture positioning relative to the securing means screw 42. Thus the finger plate may be mounted in a predetermined lateral position for mating the fingers into the belt channels yet retaining the desired dynamic lateral sliding feature.

The upper ridge 52 of the finger plate apertures 29, 30, 31 then abuts with the snap-in cover plate 43 which is held in place by flexible end flanges fitting into end notches 53 at the top surface junction of the apertures 29, 30, 31. This prevents any debris from falling into the mounting apertures. The frictional characteristics of the cover plate, preferably plastic, are preferably similar to those of the plastic surface of the finger plate 19 to prevent any disruptions or frictional drag upon articles moved over that surface.

The ridge 26 on the lower surface of the finger plate 19 abuts an edge of the mounting support member 20 and serves as a deflector for any debris that might happen to sneak under the fingers and be carried by the belt underneath the finger plate 19. Thus, any upward pressure, deflection, or tilting of the finger plate 19 from debris accumulating underneath the finger plate is eliminated.

Having therefore improved the state of the art, those novel features of the invention setting forth its spirit and nature are set forth with particularity in the following claims.

We claim:

1. An article receiving platform assembly for abutting a conveyor belt passing about a sprocket wheel of a conveyor belt thereby providing a substantially planar conveying surface characterized by the outer surface of a set of spaced ribs defining channels for receiving interdigitated members of the platform assembly, said assembly being particularly adapted for processing glass articles and removing broken glass fragments from the conveyor belt without interrupting flow of articles from the belt onto the platform assembly, comprising in combination:

a substantially rectangular finger plate of predetermined thickness over a planar mounting surface having a set of elongated laterally directed openings therethrough, a stable mounting bracket with a planar receptacle surface for slidably mating with the finger plate planar mounting surface while supporting the finger plate in position to receive articles from said belt, and fastening means for affixing said finger plate on said bracket in a laterally sliding configuration comprising lateral ridges defined along sidewalls of the finger plate elongated openings and elongated slider members extending partly through the attachment openings and firmly attached to the mounting bracket in predetermined lateral positions for permitting a designated degree of sliding contact with the lateral ridges in said finger plate for slidably securing the finger plate to said mounting member.

2. The assembly of claim 1 further characterized by short stubby fingers on said finger plates thick enough to comfortably ride in the belt channels and having pointed ends positioned below the conveying surface for engaging and scooping residue including broken glass fragments upwardly out of said channels, and having lower curved rib contour for mating peripherally about the path of the conveyor belt over said sprocket wheel to reside in said channels and by said openings being disposed in a triangular configuration in the finger plate with the attachment members lodged therein thereby to secure the finger plate tiltlessly to said mounting bracket in both lateral and longitudinal directions.

3. The assembly defined in claim 1 wherein the finger plate is made of a plastic material providing break off finger plates that snap off in the presence of excessive forces from glass fragments wedging underneath the fingers in said channel.

4. A combed finger plate article receiving platform for mating fingers in channels between ribs forming a substantially planar conveying surface of a moving modular link conveyor belt at a transfer station for transferring moving articles from the belt onto the platform assembly, comprising in combination:

a combed article finger plate generally rectangular in shape with a flat planar article supporting surface panel of predetermined thickness from which extends at one end for meshing within the channels of said belt a combed finger array providing fingers extending from said planar surface for insertion between said ribs at an arcuate position adjacent to a sprocket wheel about which the belt passes to form therewith by upper finger surfaces a coplanar conveying surface, and mounting means for securing the finger plate to a stationary mounting member at said transfer station to form said co-planar surface with said fingers interdigitated into said ribs on the belt conveying surface, said mounting means comprising a plurality of fastening stations each comprising a laterally elongated opening extending through the thickness of said platform member panel with a ridge formed along a lower edge of opening sidewall for receiving a rigidly mounted slider member thereagainst in sliding engagement with the finger plate member on the ridges, the fastening stations being distributed at laterally and longitudinally spaced apart locations on the panel for resisting tilt of the platform member away from the co-planar surface.

5. The platform member of claim 4 wherein said combed finger array is integrally formed on the platform member panel to extend said fingers from the panel at a laterally disposed linear junction and forming undersurface ribs on the panel tapered upwardly toward the junction for receiving and providing a downwardly directed discharge path for residue including broken glass fragments passing below the fingers.

6. The platform assembly defined in claim 5 wherein said stationary mounting member comprises a plate member with an edge extending laterally to the movement of the belt at the transfer station, and wherein said combed finger array is integrally formed on the platform member panel with a bottom surface extending below said platform member panel to form a ridge disposed laterally to the direction of belt movement, and abutting means in the stationary mounting member positioned to hold the edge of the stationary mounting member in abutment with the ridge of the platform member panel, thereby to deflect residue moving off the conveyor belt downwardly away from the platform assembly.

7. The platform member of claim 6 for mating at said station with a conveyor belt curving about a sprocket wheel surface, further comprising a curved contour on the underside of said fingers formed with a short arcuate segment positioned to increasingly diverge from the curved path of the conveyor belt passing about the sprocket wheel.

8. The platform member defined in claim 4 wherein said fingers have an arcuate lower surface for increasingly diverging from the path of said ribs about the sprocket wheel.

9. The platform member defined in claim 4 wherein said fastening stations further comprises a snap in planar cover member retained in said openings extending through said panel of a material and configuration that produces a flat upper planar surface on the finger plate having substantially the same constant coefficient of sliding friction over its planar surface.

10. Improved mounting means for a finger plate interdigitated with a conveyor belt for removing articles such as glassware which are subject to breakage leaving glass fragments in the conveyor belt, comprising in combination, a substantially rectangular finger plate of predetermined thickness between planar surfaces having a set of laterally oriented oblong mounting apertures therethrough, said apertures each defining low friction sidewall ridges for mating with sliding members, elongated apertured sliding members for disposition in said apertures to mate slidingly along said sidewall ridges permitting said finger plate to freely slide against the sliding member, a stable mounting platform with a planar surface slidably positioned adjacent a said finger plate planar surface, and fastening means extending through the apertures of the finger plate and the sliding members thereby positioning the finger plate in a laterally slidable configuration on said stable planar mounting platform with the slider member firmly held in place on the mounting platform to engage the sidewall ridges for preventing vertical movement of the finger plate.

11. The mounting means of claim 10 wherein said apertured sliding members have a laterally elongated aperture for receiving a mounting screw as said fastening means to affix the sliding members in a predetermined lateral position relative to the finger plate oblong aperture for aligning fingers of the finger plate in registration with an adjacent conveyor belt.

* * * * *